Figure 1:
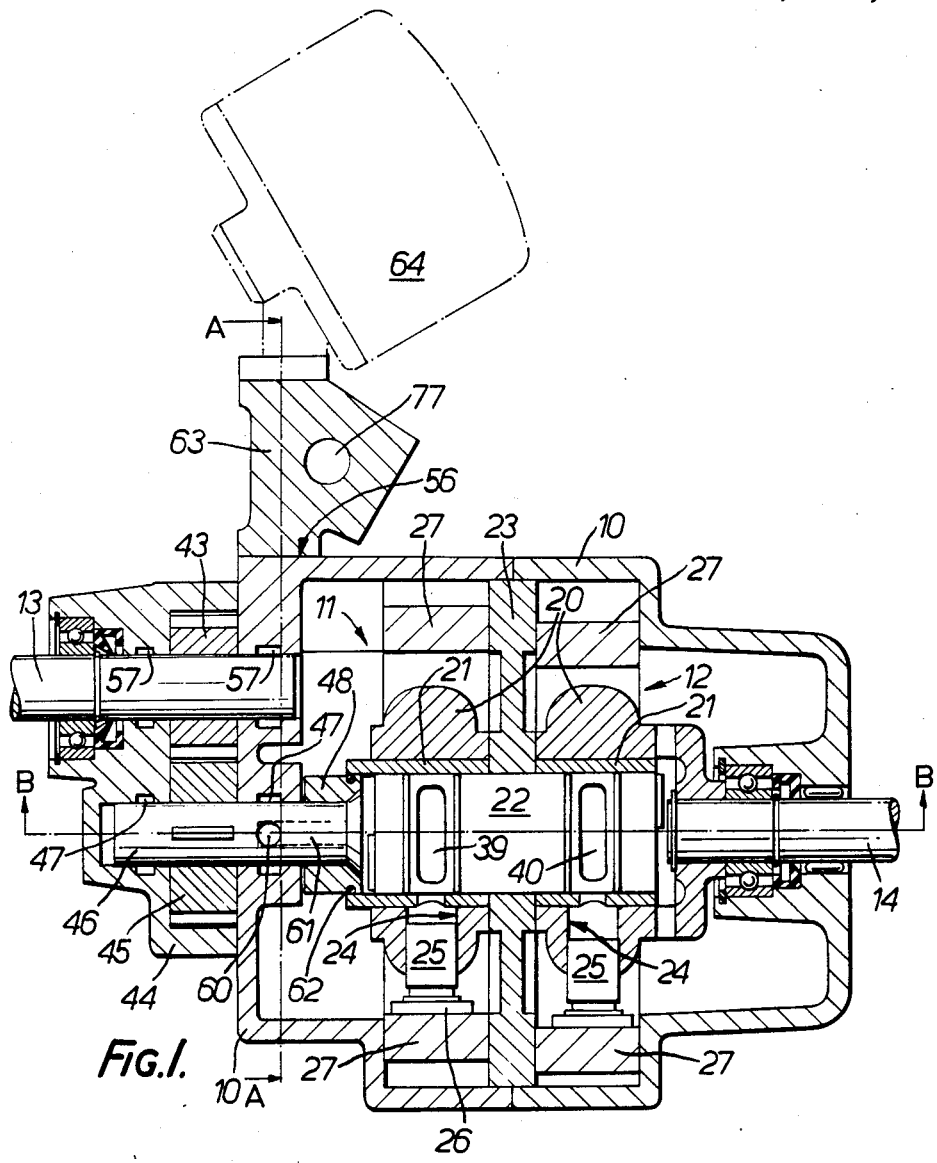

United States Patent [19]

Thoma et al.

[11] Patent Number: 4,691,512
[45] Date of Patent: Sep. 8, 1987

[54] ROTARY HYDROSTATIC MACHINES OR TRANSMISSIONS

[75] Inventors: Christian H. Thoma; George D. Mc. Arnold; Arthur A. Blair, all of Channel Islands, Great Britain

[73] Assignee: UNIPAT AG, Glarus, Switzerland

[21] Appl. No.: 668,018

[22] Filed: Nov. 5, 1984

[30] Foreign Application Priority Data

Nov. 3, 1983 [GB] United Kingdom ............... 8329441
Dec. 9, 1983 [GB] United Kingdom ............... 8332982

[51] Int. Cl.⁴ .................................. F16D 31/02
[52] U.S. Cl. ................................ 60/456; 60/487
[58] Field of Search ............. 60/456, 487, 488, 489

[56] References Cited

U.S. PATENT DOCUMENTS

| | | | |
|---|---|---|---|
| 2,220,636 | 11/1940 | Bischof | 60/487 |
| 2,928,295 | 3/1960 | Boulanger | 60/487 |
| 3,165,069 | 1/1965 | Adamek | 60/488 |
| 3,286,464 | 11/1966 | Dowty | 60/488 |
| 3,299,635 | 1/1967 | Forster et al. | 60/488 |
| 3,411,296 | 11/1968 | Peterson | 60/488 |
| 3,645,761 | 4/1972 | Eickmann | 60/488 |

*Primary Examiner*—Ronald C. Capossela
*Attorney, Agent, or Firm*—Young & Thompson

[57] ABSTRACT

A hydrostatic machine includes a casing (10) containing a rotary member (12) having radial cylinders (24) each with a piston (25) engaging a track ring (27). The member (20) is coupled to an external shaft (13) via reduction gearing (43,44) which also acts as a gear pump. This can be used to supply external power take-off fluid circuits, or an attached oil filter (64) or internal bearings (47,57) or make-up fluid for the machine via valve (42).

8 Claims, 7 Drawing Figures

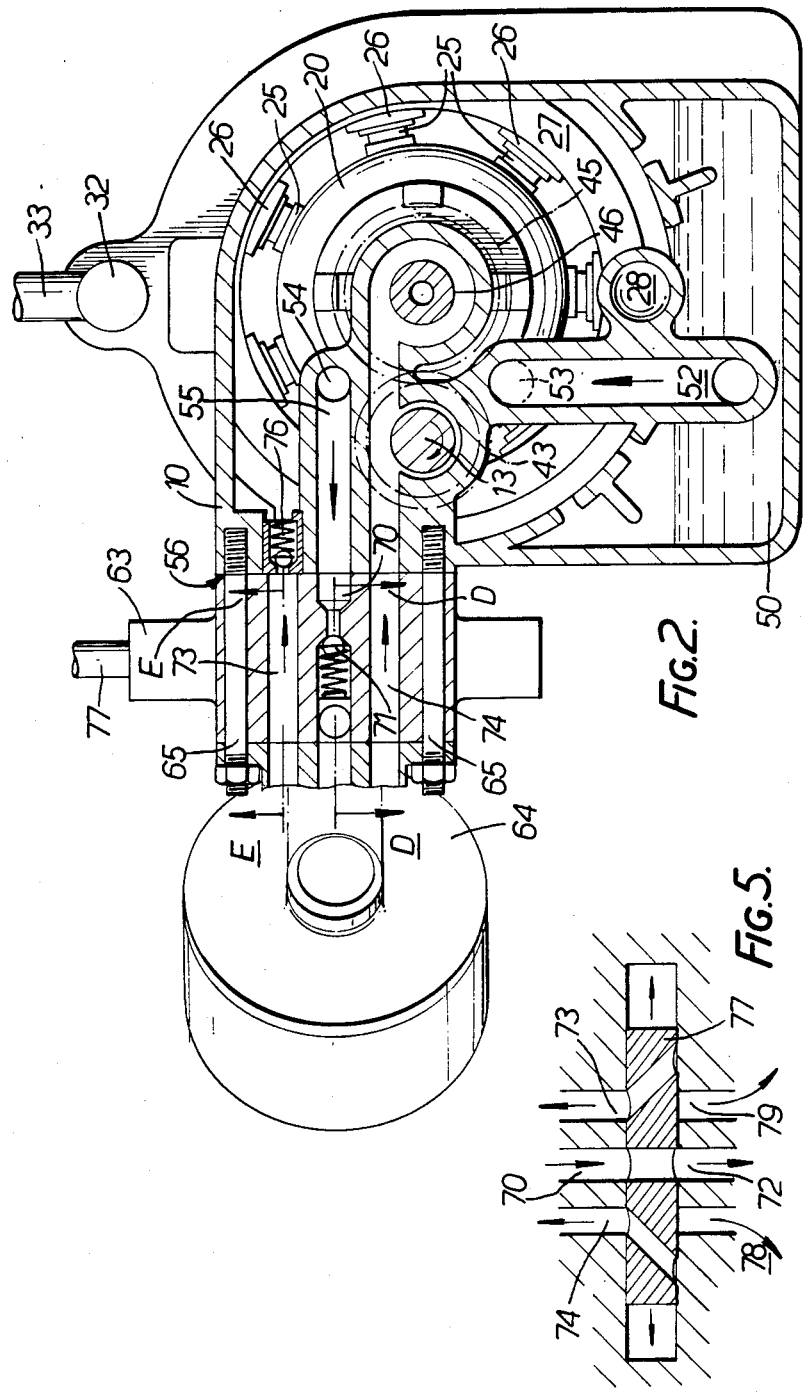

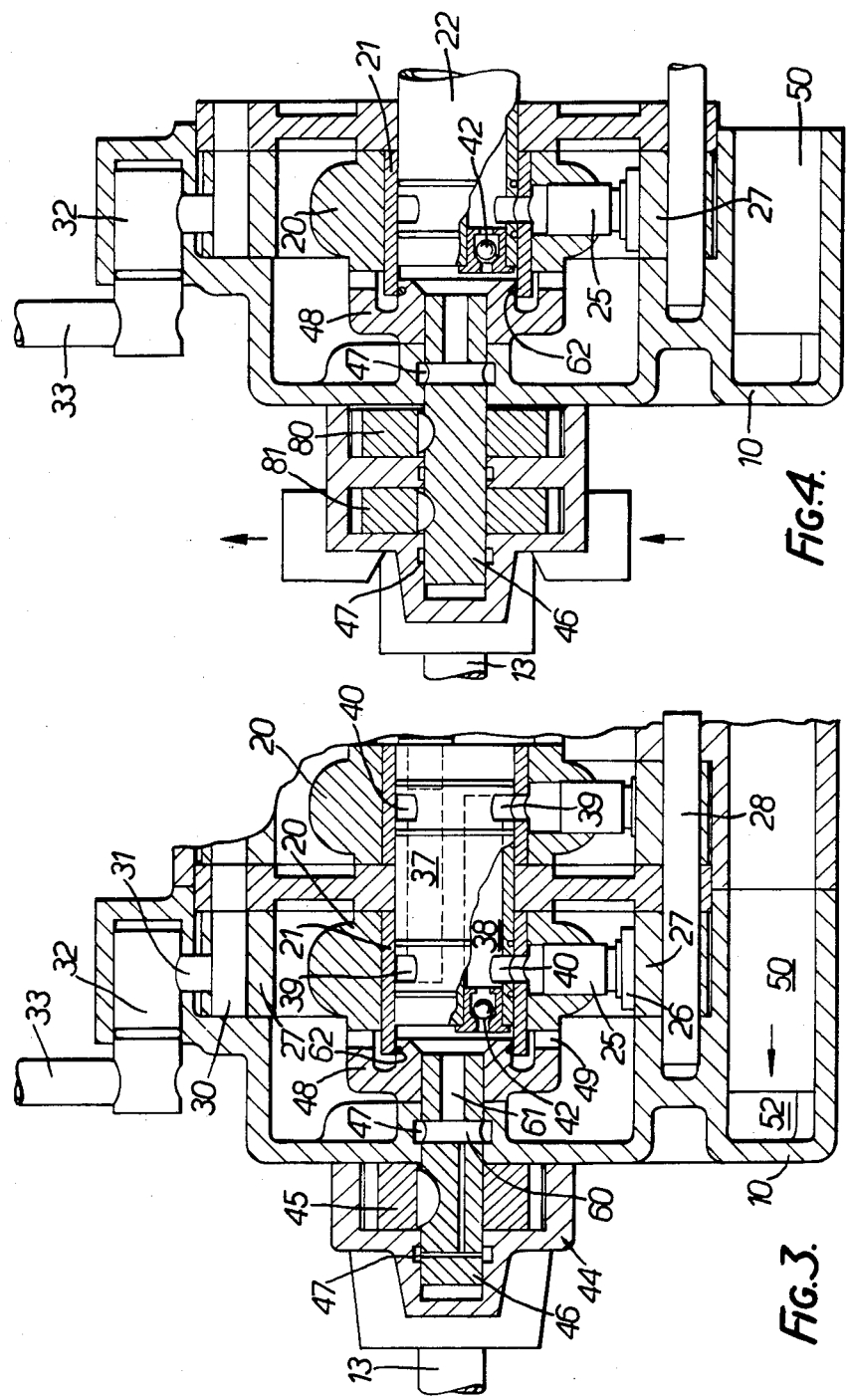

ROTARY HYDROSTATIC MACHINES OR TRANSMISSIONS

This invention relates to rotary hydrostatic machines such as pumps and motors, or complete transmissions, and is particularly, though not exclusively, applicable to radial piston machines.

It is an object of the invention to provide an improved hydrostatic machine which may be particularly suitable for example to small-scale hydrostatic transmissions such as are used in horticultural tractors and will avoid some of the problems experienced with existing transmissions.

In many installations an auxiliary hydraulic oil circuit is necessary, and there may also be a need for reducing the rotational speed of the hydrostatic pump or motor or the transmission, and it is an object of the invention to alleviate some of the problems. A preferred embodiment satisfies both the requirements mentioned above in one and the same mechanism.

Broadly stated the invention consists in a hydrostatic machine including a casing containing a rotary member which provides generally radial cylinders each accommodating a piston which is actuated by a surrounding cam track as the member rotates and including transmission means for coupling the rotary member to an external shaft and means for supplying fluid to and from the cylinders as the member rotates.

The hydrostatic machine may be a pump or motor, and may conveniently be part of a hydrostatic transmission.

According to a preferred feature of the invention the machine includes reduction gearing acting between the external shaft and the rotary member, and preferably the reduction gearing also acts as a gear pump.

The gear pump may provide high pressure oil for external power take-off purposes, and alternatively or in addition it may provide oil for use as a boost pump for the machine within the casing. Conveniently the gearing is housed in a subsidiary casing attached to one end of the machine casing.

According to another preferred feature of the invention the casing has a mounting face onto which is secured a valve body for a directional control valve, and the valve may be sandwiched between the casing and an external filter or cooler. Preferably the connections between the machine itself, and the valve, and an external filter or cooler, are in the form of internal galleries or ports, without external pipework.

The output from the auxiliary pump may be arranged to supply a fluid system which may comprise some or all of the following elements:-
1. Directional flow control valve.
2. Auxiliary rams, actuators or motors.
3. Servo system(s).
4. Pressure relief valve(s).
5. Filter.
6. Cooler.
7. Main pump or transmission boost pump.

Figure 6:
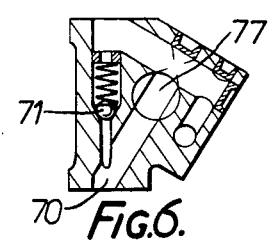
Figure 7:
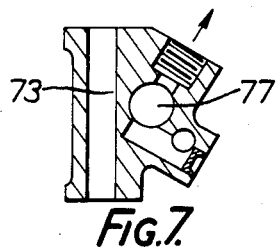

The invention may be performed in various ways and one specific embodiment will now be described, by way of example, with reference to the accompanying drawings, in which:

FIG. 1 is a sectional plan view downwards of a hydrostatic transmission according to the invention,
FIG. 2 is a cross-section on the line A—A in FIG. 1,
FIG. 3 is a partial section on the line B—B in FIG. 1,
FIG. 4 is a partial section similar to FIG. 3 illustrating a modification,
FIG. 5 is a schematic sectional view of the spool valve,
FIG. 6 is a vertical sectional view through the spool valve on the line D—D in FIG. 2, and
FIG. 7 is a vertical sectional view through the spool valve on the line E—E in FIG. 2.

In this example the invention is applied to a rotary hydrostatic transmission for a small vehicle such as a garden or agricultural tractor. The transmission comprises a main case 10 containing a rotary hydrostatic pump 11 and a hydrostatic motor 12, the engine of the vehicle being coupled to drive an external input drive shaft 13 at one end of the casing with the output shaft 14 at the other end of the casing, coupled to the vehicle's driving wheels. The pump 11 and motor 12 are of generally similar construction. Each comprises a rotary cylinder block 20 attached to a ported sleeve 21 mounted to rotate on one end of a common fixed pintle 22, which is rigidly secured in a central sandwich plate 23 acting as an internal partition within the casing 10. Each cylinder block is formed with a number of radial bores 24 each containing a piston 25 attached to a slipper 26, which runs on a surrounding annular track ring 27. The two track rings are pivotally mounted on a common transverse pivot pin 28 and at least one of the track rings is connected by a movable hinge pin 30 to an actuating lever 31 attached to a control shaft 32 connected to an external manual transmission ratio control lever 33. Thus by turning the control lever 33 the eccentricity of the track ring 27 is altered in relation to the fixed pintle 22, thus altering the volumetric capacity of the pump and hence the transmission ratio of the complete machine.

The fixed pintle 22 has two internal longitudinal passages 37,38 each opening at opposite ends into an arcuate port 39,40 which communicates with respective cylinder bores 24 as the cylinder members 20 rotate. At one or both ends of the pintle there is provided a nonreturn valve 42 arranged to allow additional fluid to be drawn into the circuit for "make-up" purposes to replace any fluid lost by leakage.

The external input drive shaft 13 is keyed to a gear 43 located in an auxiliary casing 44, this gear meshing with a larger diameter gear 45 within the same auxiliary casing and keyed to the internal drive shaft 46, which is supported in hydrostatic bearings 47 and connected to a drive coupling element 48 provided with dogs 49 by which it is coupled to the rotary member 20. The two meshing gears 43,45 act as a gear pump and draw oil from a reservoir 50 up a feed passage 52 to a pump inlet 53. The high pressure oil delivered by the gear pump at outlet 54 passes to a supply passage 55 leading to a face 56 on the side of the casing 10. Some of this pressure oil is used to supply the hydrostatic bearings 47 and other bearings 57 on the shaft 13 and some of the oil also passes via a port 60 and a passage 61 in the end of the drive shaft 46, to provide oil for the non-return valve 42. A seal 62 is provided between the coupling element 48 and the sleeve 21 to maintain the oil pressure at the inlet valve 42.

Attached to the face 56 on the machine case is a directional control valve indicated generally at 63, the opposite side of the valve block being connected to an external oil filter or cooler unit 64, the three parts being rapidly held together by screw-thread anchorage studs 65. The internal functions of the valve are illustrated diagrammatically in FIG. 5 and the connections with an external power take-off circuit are illustrated in FIGS. 6 and 7.

As seen in FIG. 2, the pressure oil supplied by the internal gear pump through the delivery passage 55 passes into a central bore 70 in the valve body and thence through a non-return valve 71 to a passage 72 leading to the interior of the filter 64. The filtered oil returns from the filter 64 along the two passages 73, 74. Passage 73 leads to a pressure relief valve 76 which maintains the necessary operating pressure and returns excess oil back to the reservoir 50. The other return passage 74 supplies oil to the hydrostatic bearings mentioned above and also to the power take-off via the control elements of valve 63. The valve 63 includes a movable valve spool 77 which, as shown in FIG. 5, acts partly as a communication between the pump casing and the filter 64, and partly as a reversing valve between two output lines 78,79 leading to remote power take-off connections for an external pressure ram or the equivalent. These are illustrated in FIGS. 6 and 7.

The construction illustrated in FIG. 4 is basically similar to that in the illustrated example, but here the auxiliary gear pump pair 43,45 is replaced by a double stacked gear pair illustrated at 80,81. One pair of gears may be arranged to supply high pressure oil for power take-off purposes while the other pair runs at lower pressure for circulating oil through the filter cooler and provides boost pressure for make-up to the pump 11 via the non-return inlet valve 42. Preferably both gear pairs act in parallel and share the mechanical drive to the hydrostatic pump.

FIGS. 1 to 7 show a device designed to run as a "dry case" machine. This is preferred as a means of eliminating oil churning losses, which can be considerable at high rotational speeds.

However, the system may equally be applied to "wet case" machines offering a reduction in churning losses from the reduced input rotational speed.

In the illustrated example the gear pair acts as a reduction gear allowing reduced rotational speeds within the casing of the machine, but in some applications such as a low speed low power windmill transmission, the gear may be inverted to provide a step-up ratio. The auxiliary pumping action of the gear pair can however be maintained, the larger gear acting as the input driving element. In place of a conventional gear pair it is also possible to obtain the required results by a "crescent gear pump", having a small pinion engaging an internally toothed annulus gear.

In the illustrated example it will be seen that the valve body has aligned inlet and outlet ports on opposite faces and the external filter or cooler has similar aligned inlet and exit ports whereby the filter or cooler can be attached directly to the machine casing without the interposed valve body.

We claim:

1. A hydrostatic machine including a casing, a rotary member for rotation within the casing and formed with generally radial cylinders each accommodating a piston connected to a slipper which engages a surrounding cam track as the member rotates, and including an external shaft, and transmission means including reduction gearing for coupling the rotary member to said external shaft, said reduction gearing comprising a relatively small diameter gear connected to said external shaft and a relatively large diameter gear connected to said rotary member, said reduction gear pair acting also as a fluid gear pump for supplying fluid under pressure.

2. A hydrostatic machine according to claim 1, in which said reduction gearing acts as a boost pump to supply pressure fluid to the cylinders of the rotary member within the casing.

3. A hydrostatic machine according to claim 1, wherein the larger diameter gear of said gear pair is secured to a transmission shaft which is coupled to said rotary member, and said transmission shaft is provided with an internal passage constituting the output flow passage from said gear pump.

4. A hydrostatic machine according to claim 3, in which said output flow passage communicates with a fluid inlet formed in a fixed pintle, on which said rotary member rotates, and including a fluid seal between said transmission shaft and said rotary member.

5. A hydrostatic machine according to claim 1, in which said reduction gearing provides high pressure oil for external power take-off purposes.

6. A hydrostatic machine according to claim 1, in which said gearing is housed in a subsidiary casing attached to one end of the machine casing.

7. A hydrostatic machine according to claim 1, which provides a hydrostatic transmission, said casing containing a hydrostatic pump and motor mounted concentrically on a common fixed pintle within the casing.

8. A hydrostatic machine according to claim 7, in which the said pump is connected to an external shaft through transmission means acting as reduction gearing and as a fluid gear pump and said motor is connected to an external drive shaft.

* * * * *